July 3, 1962 E. J. SAXL 3,041,874
VARIABLE TRANSFORMER CONTROL AND INDICATING SYSTEM
Filed Jan. 29, 1958 2 Sheets-Sheet 1

Inventor:
Erwin J. Saxl,
by Arthur D. Thomson
Attorney

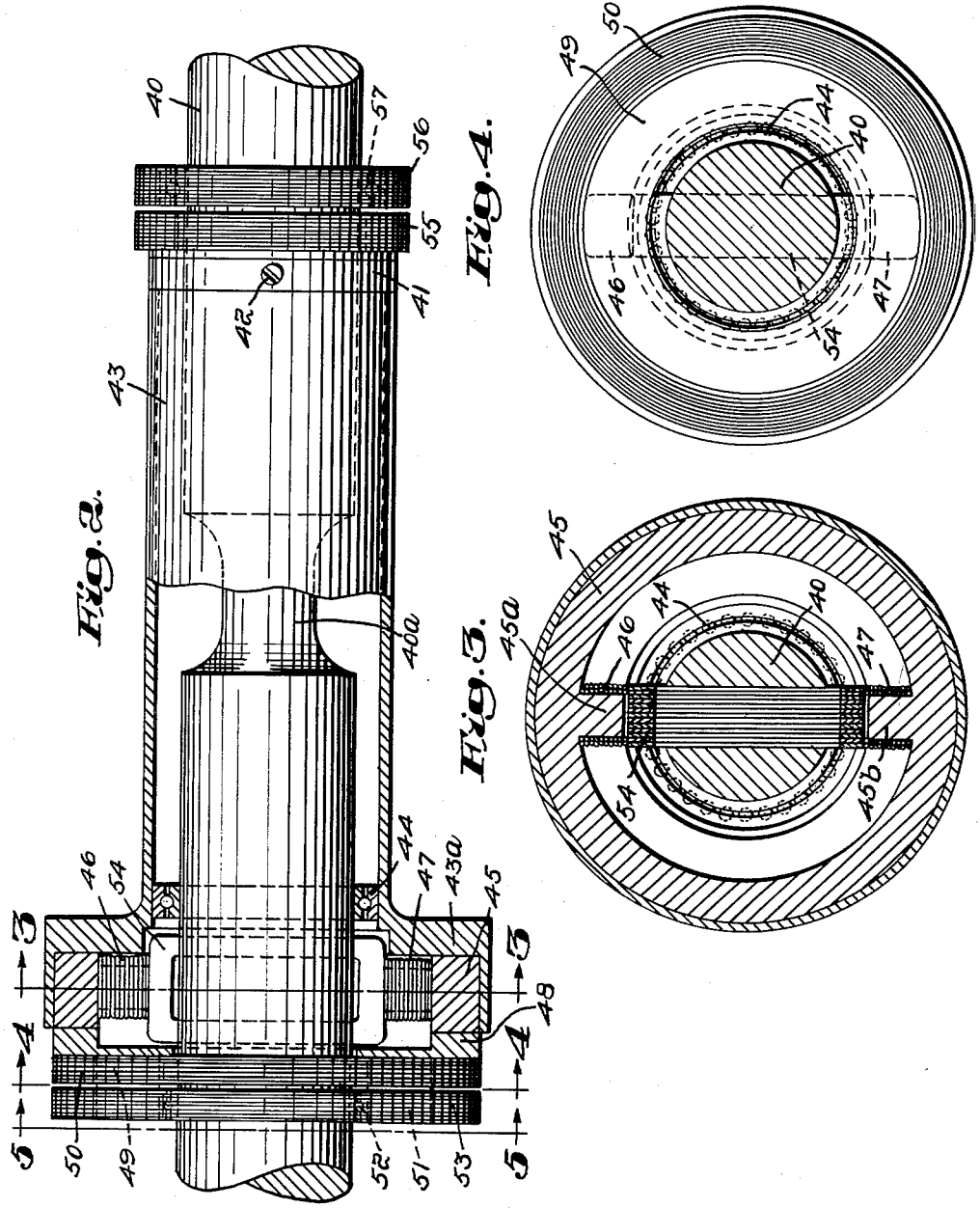

United States Patent Office 3,041,874
Patented July 3, 1962

3,041,874
VARIABLE TRANSFORMER CONTROL AND
INDICATING SYSTEM
Erwin J. Saxl, Harvard, Mass.
Filed Jan. 29, 1958, Ser. No. 711,848
6 Claims. (Cl. 73—136)

This invention relates in general to electrical systems for detecting small angular or linear displacements and producing an electrical signal in accordance with the detected displacement. More particularly, this invention relates to systems which employ, as the detecting element, a transformer having means for varying the voltage induced in the secondary winding in accordance with the displacement which is to be detected.

One way to vary the secondary voltage of a transformer is to employ a movable core piece which changes an air gap in the core. Another way is to employ relatively movable primary and secondary coils. A transformer may be designed, on either principle, to detect either linear or angular displacement. By way of example, the detecting element is here described as a transformer having a rotatable secondary coil. Such a detecting element may be used, for example, to detect the rotational strain due to torque on a shaft, and the system here described will yield an electrical signal which indicates both the magnitude and the direction of the torque.

The general object of the invention is to provide a simple and reliable device for detecting angular or linear displacements, especially relatively small displacements, and producing an electrical signal which indicates both the magnitude and the direction of the displacement. Another object is to produce a detecting device which is relatively unaffected by such factors as ambient temperature, which has a long life, and which will yield a relatively high signal output for small displacements.

The device consists in general of a transformer having a movable element, such as a movable core piece or a movable secondary coil, for varying the secondary output, and a rectifying bridge circuit which receives the A.C. output of the transformer secondary and converts this output into a D.C. signal substantially proportionate to the displacement of the movable transformer element, and of a polarity dependent on the direction of the displacement with respect to a predetermined zero position.

In the drawings illustrating a preferred embodiment of the invention:

FIG. 2 is a side view of a transformer adapted to detect strain due to torque on a shaft, and used as the detecting element in the system;

FIG. 3 is a cross-section taken along line 3—3 of FIG. 2;

FIG. 4 is a cross-section taken along line 4—4 of FIG. 2;

Figure 1:
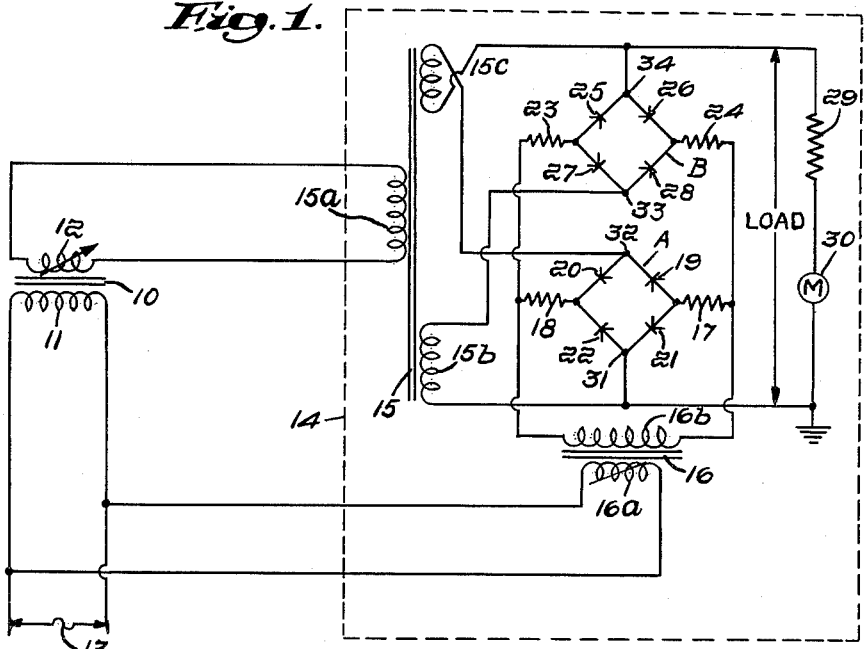
FIG. 1 is an electrical schematic diagram of a control system according to the invention.

In the diagram of FIG. 1, the detecting transformer 10 is indicated schematically as having a primary winding 11 and a secondary winding 12, the output voltage of which is variable according to a detected displacement. The primary winding 11 is connected to a source of A.C. current 13. The conversion circuit included within the dotted line 14, has a primary input transformer 16 and a secondary input transformer 15. Transformer 16 has a primary winding 16a which is connected to the current supply source 13, and a secondary winding 16b. Transformer 15 has a primary winding 15a which is connected to secondary 12, and a pair of independent secondary windings 15b and 15c.

Secondary 16b is connected to form the power supply for a pair of rectifier bridge circuits, generally indicated as A and B, connected in parallel back to back. Bridge circuit A consists of limiting resistors 17 and 18, and matched rectifiers 19, 20, 21 and 22. Bridge circuit B consists of limiting resistors 23 and 24, and matched rectifiers 25, 26, 27 and 28.

A load circuit consisting of resistance 29 and a D.C. meter 30 are connected in series between the junction point 31 of bridge A and the junction 34 of bridge B. Secondary 15b is connected to junction 31 and to junction 33 of bridge B. Secondary 15c is connected to junction 34 and to junction 32 of bridge A. The operation of the circuit is as follows:

During the half cycle when the right-hand end of secondary 16b is positive, bridge A conducts from right to left and junctions 31 and 32 are necessarily at the same potential. No current can flow from secondary 15c through the meter because this circuit is blocked by bridge A. Bridge B does not conduct current from secondary 16b on this half cycle. Assuming the voltages induced in secondaries 15b and 15c are in phase with that of 16a and the lower end of 15b is positive, current will flow from the lower end of 15b up through meter 30 and resistance 29, through leg 26 of bridge B, across bridge A from right to left, through leg 27 of bridge B and back to the upper end of secondary 15b. On the next half cycle, secondary 15b is blocked by bridge B which is now conducting. Current flows from the now positive upper end of secondary 15c through leg 20 of bridge A, across bridge B from left to right, through leg 21 of bridge A, up through meter 30 and resistance 29, and back to the lower end of secondary 15c.

If the voltage induced in secondaries 15b and 15c is reversed in phase with respect to that of secondary 16b, on the first half cycle, current will flow from the upper end of secondary 15b through leg 28, back across bridge A, through leg 25 and downward through the meter and resistance 29. On the next half cycle current will flow from the lower end of secondary 15c downward through resistance 29 and meter 30, through leg 22, back across bridge B, and through leg 19 to the upper end of 15c.

It is thus apparent that a full wave rectified current is produced across the load circuit when a voltage is impressed on primary 15a. This current is proportionate to the magnitude of this impressed voltage and therefore to the magnitude of the voltage induced in secondary 12. The direction of the rectified current will be reversed if the phase of the voltage of secondary 12 is reversed.

The current across the load circuit of this bridge will also vary according to the phase angle between the voltage impressed on secondary 16b and that impressed on secondaries 15b and 15c, being maximum when these voltages are in phase and zero when these voltages are 90° out of phase. In this case, however, the circuit is used in combination with a variable transformer in which the phase relationship between the primary and secondary current is of fixed value and merely reverses in sign or polarity.

The variable transformer 10, which may be called the "detecting transformer," consists essentially of a fixed primary coil 11 and a rotatable secondary coil 12. When the latter coil is in a position parallel to the lines of flux induced in the transformer core by primary 11, no secondary current will be induced. When the secondary is rotated out of this position a secondary current will be induced. This current varies in magnitude sinusoidally with respect to the angle of rotational displacement.

As the load on secondary 12 is constant, the phase relationship between the primary and secondary currents of the transformer will be constant but the current will be reversed in polarity as the secondary coil passes through the position in which it is parallel to the flux. With such a detection device, the bridge circuit operates as a current magnitude responsive circuit and its response to phase relationship is used merely to distinguish the polarity of the input signal derived from secondary 12.

The pick-up unit used with this device is adapted for measuring torque, for example, on a driven shaft, such as an aircraft or marine propeller shaft. As illustrated in FIGS. 2 through 5, the device is mounted on a portion of a shaft 40, the left-hand end of which may be connected to a motor or other driving device and the right-hand end of which may be connected to a propeller or other load in any conventional manner. A ring 41 is mounted on the shaft and secured by means of one or more set screws 42. Fixed to this ring is a tubular casing 43 which is disposed coaxially around the shaft. The left-hand end of the casing is supported on the shaft by means of a ball bearing 44.

The left-hand end of the casing is widened to form a flange 43a on which is mounted a ring-shaped magnetic core 45 having a pair of oppositely disposed, inwardly projecting pole pieces 45a and 45b. A pair of primary coils 46 and 47 are wound around studs 45a and 45b, respectively, parallel to the axis of the shaft. A ring-shaped shield plate 48 is mounted on core 45, and carries another ring-shaped core 49 on which an auxiliary secondary coil 50 is wound circumferentially. Another ring 51 is mounted on a ball bearing 52 on the shaft, and carries a circumferentially wound auxiliary primary coil 53. The shaft is slotted in the region of core 45 to receive a transversely wound secondary coil 54 which forms the movable secondary of the variable transformer. Plate 48 shields both coils 46 and 47 and coil 54 against stray induction from coils 50 and 53. Furthermore, coils 50 and 53, being wound circumferentially of the shaft are disposed in a plane perpendicular to the planes of coils 46 and 47 and coil 54, both of which lie in planes parallel to the axes of the shaft but at right angles to each other.

On an extension on the right-hand side of the ring 41 is mounted a circumferentially wound auxiliary primary coil 55. Next to this an auxiliary secondary coil 56 is wound around the outer race of a ball bearing 57 on the shaft. Coils 55 and 56 are disposed in planes at right angles to coils 46 and 47 and coil 54.

Figure 6:
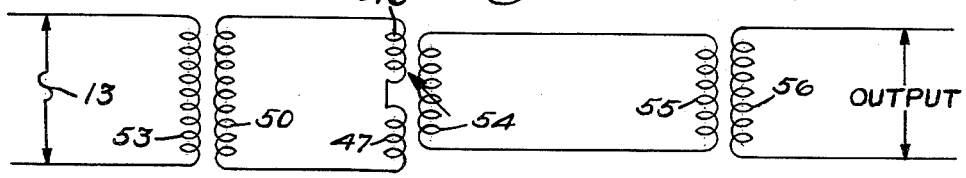
FIG. 6 is an electrical schematic diagram of the internal wiring of the transformer.
Figure 5:
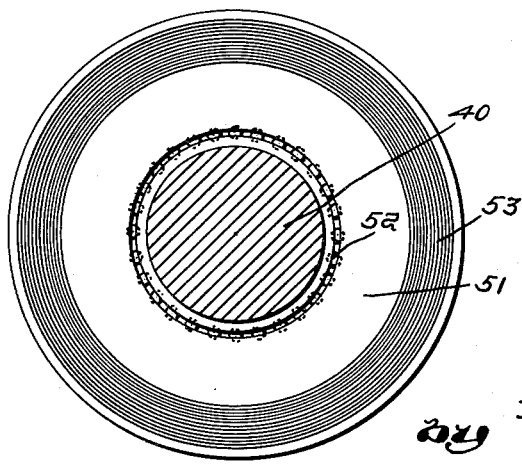
FIG. 5 is an end view of the transformer, taken along line 5—5 of FIG. 2.

The electrical connections of the detection unit just described are illustrated in FIG. 6. Coil 53 is connected to the A.C. power source 13. Coil 50 is connected in series with coils 46 and 47, and coil 54 is connected in series with coil 55. Coil 56, from which the detected signal is taken off, is connected to the conversion circuit 14. For example, with the circuit shown in FIG. 1, coil 56 would be connected in series with the input transformer primary 15a, in place of secondary 12. The operation of the detection device is as follows:

Coils 53 and 56, which are mounted on bearings on the shaft, are stationary. Therefore, connections to the power source and the external circuit can be made directly without the use of slip rings. When A.C. current is supplied to coil 53, a corresponding current is induced in secondary 50 and flows through primary coils 46 and 47, setting up a magnetic field in core 45. Casing 43, and the parts which it carries, such as core 45, coil 50 and coil 55, rotate with the shaft. As the casing is fixed to the shaft only at one end, no torsional strain is transmitted to the casing, and the end on which core 45 is mounted remains torsionally in line with the part of the shaft on which ring 42 is mounted. The shaft, however, will twist under torsional load and coil 54 will, accordingly, be deflected with respect to core 45 by an angle proportionate to the torque on the shaft. If desired, the shaft may have a cut-out portion 40a to increase the angular deflection in the region between ring 42 and coil 54. Under zero load condition of the shaft, coil 54 is aligned parallel to the magnetic flux between studs or pole pieces 45a and 45b, and accordingly no current is induced in coil 54. When the shaft is running under load, the torsional strain will produce an angular deflection of coil 54 with respect to the magnetic flux and current will be induced in coil 54. This current varies sinusoidally with respect to the angle of deflection. However, the device is used within a small range of deflections to either side of zero and for practical purposes, the current variation with respect to angle of deflection may be considered linear. It is thus apparent that the current induced in secondary 54 is substantially proportionate to the torque on the shaft and that the polarity of the current will be reversed when the torque is reversed in direction.

Th current induced in coil 54 flows through auxiliary primary 55, in turn inducing current in secondary 56. This current, when fed to input secondary 15a will result in a D.C. current across meter 30 substantially proportionate to the torque on the shaft, as previously described. An indication of both the magnitude and the direction of the torque is thus obtained. The resulting D.C. current may, of course, be used to operate various kinds of control devices, for example, a speed control for the motor driving the shaft, or a control for a variable pitch propeller driven by the shaft. Where the system is used for control purposes, the load circuit current would be applied as the input to a suitable current or voltage responsive control device. As torque of a propeller shaft is directly related to propeller thrust, this device is useful for indicating or controlling propeller thrust.

The circuit here disclosed is operable on A.C. current of various frequencies, standard 60 cycle, 400 cycle aircraft, or even higher frequencies where quick response to small variations in torque is essential.

The detection unit requires no slip rings or other sliding contacts which are subject to sparking and wear, and the unit is comparatively invulnerable to the effects of high temperature, shock and vibration. Shaft run-out will not appreciably affect the current induced in coil 54 because the increase in the air gap at one side of the coil is compensated for by a corresponding decrease in the air gap on the opposite side. The components of the resolving circuit may be mounted at considerable distance from the detecting unit so that the system is suitable for detecting or controlling torque on shafts mounted in in accessible locations or subject to high ambient temperatures. Another advantage of the device is that it has a definite zero position as the induced current on coil 54 reverses and therefore passes through zero.

I claim:

1. In combination with a shaft subject to torque, an electrical device for detecting torque in said shaft comprising: a tubular casing mounted concentrically on said shaft and having one end fixed to said shaft and another end free to rotate about said shaft; a transformer core mounted on said free end and having pole pieces disposed substantially radially on opposite sides of said shaft; a pair of primary sensing coils wound on said pole pieces about axes substantially radial to said shaft and adapted when energized to induce a magnetic field between said pieces; a secondary sensing coil disposed transversely on said shaft between said pole pieces and disposed parallel to the electrical field induced by said primary sensing coils when no torque is applied to the shaft; a first induction coil rotatably disposed around said shaft adjacent the free end of said casing; a second induction coil mounted on said free end and disposed to receive induced current from said first induction coil, said second induction coil being connected to said primary sensing coils; a third induction coil mounted on said casing and connected to said secondary sensing coil; and a fourth induction coil rotatably disposed around said shaft adjacent said third induction coil and disposed to receive induced current from said third induction coil.

2. The combination described in claim 1, said first, second, third and fourth induction coils being all disposed circumferentially around said shaft and at right angles to said primary sensing coils.

3. In combination with a shaft subject to torque, an electrical device for detecting torque in said shaft comprising: a tubular casing mounted concentrically on said shaft and having one end fixed to said shaft and another end free to rotate about said shaft; a transformer core mounted on said free end adjacent said shaft; a primary sensing coil wound on said core; a secondary sensing coil disposed on said shaft at right angles to said primary sensing coil, a first induction coil disposed adjacent said free end; a second induction coil mounted on said free end adjacent to, and disposed to receive induced current from said first induction coil, said second induction coil being connected to said primary sensing coil; a third induction coil mounted on said casing adjacent said fixed end and connected to said secondary sensing coil; and a fourth induction coil disposed adjacent said third induction coil and disposed to receive induced current therefrom, all four of said induction coils being disposed at right angles both to said primary sensing coil and to said secondary sensing coil.

4. A torque detecting device as described in claim 3, having means connected to said first induction coil for supplying alternating current thereto and thereby inducing current in said second induction coil, and a circuit including said fourth induction coil and adapted to convert alternating current induced therein to a direct current of proportionate magnitude and of one polarity when the currents in said first and fourth induction coils are in phase and opposite polarity when they are of opposite phase.

5. In combination with a rotatable body subject to torque about a predetermined axis, an electrical device for detecting torque in said body comprising: a rigid supporting member having one end fixed to said body and another end free to rotate relative to said body about said axis; a primary sensing coil and a secondary sensing coil, one mounted on said free end and one fixed to said body adjacent said free end, said sensing coils being disposed along perpendicular planes; a first and a second induction coil disposed adjacent one another, said body being rotatable with respect to said first induction coil and said second induction coil being fixed to said body; a third and a fourth induction coil disposed adjacent one another and remote from said first and second induction coils, said third induction coil being fixed to said body and said body being rotatable with respect to said fourth induction coil, all said induction coils being disposed in planes perpendicular to both said sensing coils; an electrical connection between said second induction coil and said primary sensing coil; and an electrical connection between said secondary sensing coil and said third induction coil.

6. A device as described in claim 5, said sensing coils being disposed along planes parallel to said axis, and said induction coils being disposed along planes perpendicular to said axis.

References Cited in the file of this patent

UNITED STATES PATENTS

| 2,394,079 | Langer | Feb. 5, 1946 |
| 2,457,700 | Martin | Dec. 28, 1948 |
| 2,531,228 | MacGeorge | Nov. 21, 1950 |
| 2,548,397 | Schaevitz | Apr. 10, 1951 |
| 2,666,177 | Brannin | Jan. 12, 1954 |
| 2,895,332 | Dahle et al. | July 21, 1959 |
| 2,912,642 | Dahle | Nov. 10, 1959 |

FOREIGN PATENTS

| 689,189 | Great Britain | Mar. 25, 1953 |